United States Patent
Joshi et al.

(10) Patent No.: US 10,920,595 B2
(45) Date of Patent: Feb. 16, 2021

(54) TURBINE COMPONENT HAVING MULTIPLE CONTROLLED METALLIC GRAIN ORIENTATIONS, APPARATUS AND MANUFACTURING METHOD THEREOF

(71) Applicant: GENERAL ELECTRIC COMPANY, Schenectady, NY (US)

(72) Inventors: Narendra Digamber Joshi, Niskayuna, NY (US); Nicholas Joseph Kray, West Chester, OH (US); Samar Jyoti Kalita, Cincinnati, OH (US); Paul Marsland, Cincinnati, OH (US); Wayne Spence, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 895 days.

(21) Appl. No.: 15/405,656

(22) Filed: Jan. 13, 2017

(65) Prior Publication Data
US 2018/0202293 A1 Jul. 19, 2018

(51) Int. Cl.
| | |
|---|---|
| *F01D 5/14* | (2006.01) |
| *B22F 5/04* | (2006.01) |
| *F01D 9/04* | (2006.01) |
| *F01D 25/00* | (2006.01) |
| *B33Y 10/00* | (2015.01) |
| *B22F 3/105* | (2006.01) |
| *B23K 26/342* | (2014.01) |

(Continued)

(52) U.S. Cl.
CPC ............ *F01D 5/147* (2013.01); *B22F 3/1055* (2013.01); *B22F 5/04* (2013.01); *B23K 26/082* (2015.10); *B23K 26/342* (2015.10); *B33Y 10/00* (2014.12); *F01D 9/041* (2013.01); *F01D 25/005* (2013.01); *B22F 2207/01* (2013.01); *B22F 2207/11* (2013.01); *B22F 2998/10* (2013.01); *B22F 2999/00* (2013.01); *B23K 2101/001* (2018.08); *B23K 2103/26* (2018.08); *B33Y 80/00* (2014.12); *F05D 2220/32* (2013.01); *F05D 2300/606* (2013.01); *F05D 2300/608* (2013.01)

(58) Field of Classification Search
CPC . F01D 5/147; F05D 2300/608; B22F 2207/11
See application file for complete search history.

(56) References Cited

U.S. PATENT DOCUMENTS

| | | |
|---|---|---|
| 4,518,442 A | 5/1985 | Chin |
| 5,116,572 A | 5/1992 | Narayanan et al. |

(Continued)

FOREIGN PATENT DOCUMENTS

| | | |
|---|---|---|
| DE | 19649865 C1 | 2/1998 |

*Primary Examiner* — Phutthiwat Wongwian
*Assistant Examiner* — Arnold Castro
(74) *Attorney, Agent, or Firm* — Dority & Manning, P.A.

(57) ABSTRACT

The present disclosure generally relates to turbine engine components having multiple controlled metallic grain orientations. In general, the primary grain orientation is aligned substantially perpendicular to the longitudinal axis of the turbine engine component while the secondary grain orientation is aligned substantially parallel to the longitudinal axis. Such controlled grain orientations provide the blades and vanes with increased strength to withstand the thermal-mechanical stresses of the turbine operation. The disclosure also relates to turbines having these fortified components, and methods of manufacturing the components.

12 Claims, 8 Drawing Sheets

(51) Int. Cl.
*B23K 26/082* (2014.01)
*B33Y 80/00* (2015.01)
*B23K 101/00* (2006.01)
*B23K 103/18* (2006.01)

(56) References Cited

U.S. PATENT DOCUMENTS

| | | |
|---|---|---|
| 5,338,510 A | 8/1994 | Zuech |
| 5,451,142 A | 9/1995 | Cetel et al. |
| 8,343,288 B2 | 1/2013 | Murakami et al. |
| 2011/0058934 A1* | 3/2011 | James ............... F01D 5/187 |
| | | 415/177 |
| 2011/0058949 A1* | 3/2011 | Marra ............... B23K 31/022 |
| | | 416/233 |
| 2014/0154088 A1 | 6/2014 | Etter et al. |
| 2014/0255620 A1 | 9/2014 | Shuck et al. |
| 2016/0008922 A1 | 1/2016 | Schwarze |
| 2017/0141625 A1* | 5/2017 | Tangudu ............ H01F 41/0233 |

* cited by examiner

TURBINE COMPONENT HAVING MULTIPLE CONTROLLED METALLIC GRAIN ORIENTATIONS, APPARATUS AND MANUFACTURING METHOD THEREOF

INTRODUCTION

The present disclosure generally relates to a metal component having multiple controlled metallic crystal or grain orientations, an apparatus having the same and methods of manufacturing the same. More specifically, the metal component is prepared using an additive manufacturing (AM) method, which includes but is not limited to the direct metal laser melting (DMLM) or direct metal laser sintering (DMLS) method. The metal component produced is especially useful as a component of an aircraft engine or other power generation turbines, e.g. a turbine blade or a stator vane.

BACKGROUND

Additive manufacturing encompasses a variety of technologies for producing components in an additive, layer-wise fashion. These technologies can broadly be group into one of seven major classes based on the mechanism in which each layer is formed: photopolymerization, extrusion, sheet lamination, beam deposition, direct write and printing, powder bed binder jet printing, and powder bed fusion. In powder bed fusion, a focused energy beam is used to fuse powder particles together on a layer-wise basis. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

Figure 1:
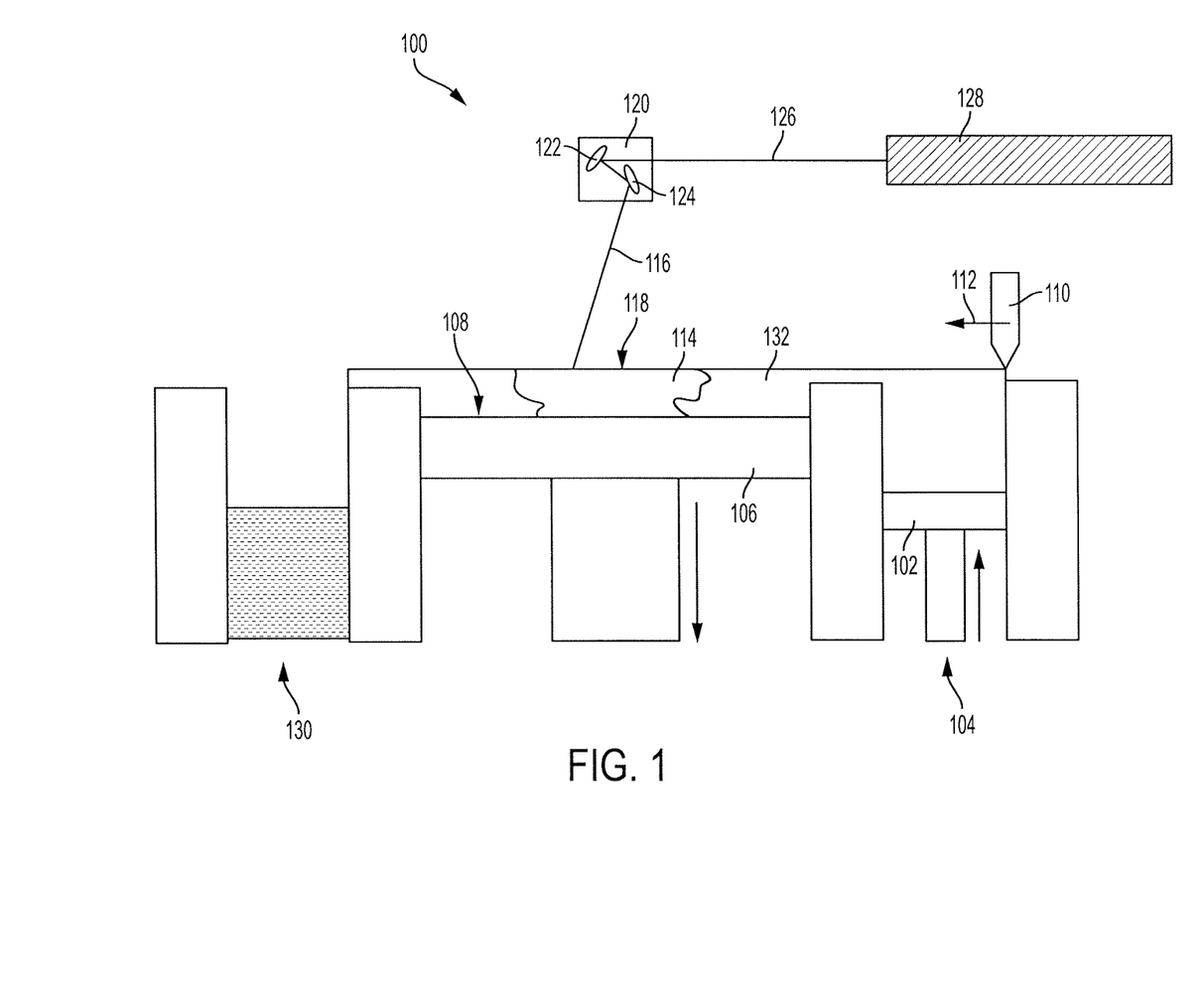
FIG. 1 is a schematic diagram showing a conventional laser powder bed fusion additive manufacturing process.

A description of a typical laser powder bed fusion process is provided in German Patent No. DE 19649865, which is incorporated herein by reference in its entirety. Referring to FIG. 1, a laser powder bed fusion system such as the system 100 includes a build plate 106 that is flanked by a feed powder reservoir 104 at one end and an excess powder receptacle 130 at the other end. During production, an elevator 102 in the feed powder reservoir 104 lifts a prescribed dose of powder above the level of a build plate 106. The prescribed dose of powder is then spread in a thin, even layer 132 over the build surface 108 by a recoater mechanism 110. For example, as shown in FIG. 1, the powder is spread in a direction as indicated by the arrow 112. Overflows from the build plate 106 are collected by the excess powder receptacle 130, then optionally treated to sieve out rough particles before re-use.

The recoater mechanism 110 may be a hard scraper, a soft squeegee, or a roller. Alternatively or additionally, powder may be supplied by a hopper from above the build surface. The powder layer thickness is typically between 10 μm and 100 μm. A selective portion of the powder 114 that corresponds to a "slice" or a layer of the part to be manufactured is then sintered (as it is in SLS and DMLS) or melted (as it is in SLM and DMLM) by a focused laser 116 scanning across the surface of the selective portion 118. In other words, the powder layer 132 is subjected to laser radiation in a site-selective manner in dependence on computer-aided design (CAD) data, which is based on the desired geometry of the work piece that is to be produced. The laser irradiation sinters or melts the raw material powder, and the sintered/melted area then re-solidifies and re-crystallizes into a fused region of the work piece.

Using a plurality of movable mirrors or scanning lenses (e.g. movable mirrors or scanning lenses 122 and 124 as shown in FIG. 1), a galvanometer scanner 120 moves or scans the focal point of the unfocused laser beam 126 emitted by the laser source 128 across the build surface 108 during the SLM and SLS processes. The galvanometer scanner in SLM/SLS processes is typically of a fixed position but the movable mirrors/lenses contained therein allow various properties of the laser beam to be controlled and adjusted. The speed at which the laser is scanned is a critical controllable process parameter, impacting how long the laser power is applied to a particular spot. Typical laser scan speeds are on the order of 10 s to 100 s of millimeters per second.

Blade fatigue is a major source of failure in steam turbines and gas turbines. Blade failures in gas turbine engines often lead to loss of all downstream stages and can have a dramatic effect on the availability of the turbine engines. Fatigue is caused by the stress and strain induced by vibration and resonance within the operating range of machinery, which results in erosion and/or material build-up. For example, in aircraft engines, turbines operate at very high rotational or centrifugal speeds, pressures and temperatures. Even though they are stationary and function primarily to direct the stream propelled by the rotating blades to the next turbine stage, stator vanes which are also known as stator blades are nonetheless susceptible to fatigue. In existing technology, friction dampers are used to protect blades from high dynamic stresses. However, the success of friction dampers in reducing the high dynamic stresses incurred by the blades and thereby prolonging their lives has been modest at best. In some cases, the fatigue failures of the blade are even premature, occurring earlier than the calculated estimated lifetime of the blade.

Put simply, existing turbine engine components especially blades and vanes lack the tensile strength and ductility to withstand prolonged thermal-mechanical stress. With the current blades and vanes, the first signs of cracking can emerge at less than 1,000 start-stop cycles and/or at less than 10,000 hours of operation.

It is known that metallic materials generally have a crystalline form that is comprised of individual atoms or molecules (i.e. for alloys) of the material having predictable relationship to their neighboring atoms and molecules and this relationship extends in a repetitive fashion throughout a particular crystal or grain. Hence, most metallic articles contain many thousands of individual crystals or grains as their microstructures. The microstructures can be manipulated, for example, by refining the grain, modifying the grain structure, and/or modifying the grain orientation or direction. In the case of U.S. Patent Application No. 2014/0255620 assigned to Rolls-Royce Corporation, sonic and/or ultrasonic energy is applied onto a melt pool during solidification of the melt pool and formation of a layer of an additively manufactured article to reduce the grain size, where a solid portion of the object on which the pool is positioned at least partially surrounds the melt pool. However, this reduction of grain size has not been shown to contribute to increased tensile strength of the manufactured article.

U.S. Pat. No. 4,518,442 describes a directionally re-crystallized nickel-based superalloy sheet that is made up of aligned elongated grains with the re-crystallization direction being parallel to the axis of elongation. This superalloy sheet is produced by mechanically cold-rolling the sheet in different directions and passing the sheet through a thermal gradient having a hot end that exceeds the re-crystallization temperature of the alloy in the one of the rolling directions. Such a process of altering and controlling the metallic grain orientation would be not only laborious, but simply impracticable when it comes to the manufacturing of modern and next generation turbine engines that require components and parts having increasingly intricate and complex geometries.

U.S. Pat. No. 5,451,142 discloses a turbine blade having a zone of fine grains of a high strength composition, but only at the blade root surface. The rest of the blade, such as the airfoil which is also highly susceptible to fatigue, remains unstrengthened. This thin zone of fine grains having a high strength composition is achieved by applying a low-pressure plasma spray deposition.

A need therefore exists for turbine engine components having improved strength and ductility, which would then translate into turbine engine components showing greater reliability and durability. A need also exists for methods for manufacturing these fortified turbine engine components.

SUMMARY

In a first aspect, the present invention relates to a turbine engine component comprising a longitudinal axis, a first region with a first metallic grain orientation that is substantially perpendicular to the longitudinal axis, one or more second regions with a second metallic grain orientation that is different from the first metallic grain orientation and one or more graded transition regions disposed between the first and one or more second regions. Preferably, the component is a blade or a stator vane. The blade comprises an airfoil as the first region and a root as the second region. The stator vane comprises an airfoil as the first region, and an inner trunnion pin and an outer trunnion pin as the second regions.

In certain embodiments, the one or more graded transition regions has one or more third metallic grain orientations that are different from the first and second metallic grain orientations. Preferably, the one or more graded transition regions has a thickness in the range of 100 µm to 10,000 µm.

In a second aspect, the present invention relates to a turbine engine component comprising a longitudinal axis, a first region with a first metallic grain orientation that is substantially perpendicular to the longitudinal axis, one or more second regions with a second metallic grain orientation that is parallel to the longitudinal axis and one or more graded transition regions disposed between the first and one or more second regions.

In a third aspect, the present invention relates to a method of making a turbine engine component. The method comprises (a)(i) forming a first region of the component with a first metallic grain orientation by irradiating a first layer of metallic powder to form a first fused layer; (a)(ii) providing a subsequent first layer of metallic powder upon the first fused layer; and (a)(iii) repeating steps (a)(i) and (a)(ii) until the first region of the component is formed; and (b)(i) forming one or more second regions of the component with a second metallic grain orientation that is different from the first metallic grain orientation by irradiating a second layer of metallic powder to form a second fused layer; (b)(ii) providing a subsequent second layer of metallic powder upon the second fused layer; and (iii) repeating steps (b)(i) and (b)(ii) until the one or more second regions of the component is formed.

In some embodiments, the irradiation in the plurality of steps (a)(i) and (b)(i) is conducted at a plurality of different angles. The plurality of different angles comprises a first angle corresponding to the first metallic grain orientation, a second angle corresponding to the second metallic grain orientation, and one or more third angles corresponding to the one or more third metallic grain orientations.

In one embodiment, the layer of metallic powder in the plurality of steps (a)(i) and (b)(i), is irradiated by passing a laser beam through a galvanometer scanner and the irradiation is conducted at the plurality of different angles by adjusting the position of the galvanometer scanner.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. For example, the present invention provides a preferred method for additively manufacturing metal components, and preferably these metal components are used in the manufacture of jet aircraft engines. Specifically, the production of single crystal, nickel-based superalloy or elemental titanium metal components such as turbine blades and stator vanes can be advantageously produced in accordance with this invention. However, other metal components of the turbine may be prepared using the techniques described herein.

The brittleness of current blades (including turbine blades and compressor blades) and vanes is chiefly attributed to the isotropic nature of these radial turbine engine components. In other words, the grains and crystals contained in these components have a random orientation. The present inventors have found that these highly stressed turbine engine components can be strengthened by manipulating the microstructure of these components in such a manner that the microstructure is composed of grains aligned in at least a primary orientation and a secondary orientation. Preferably, the primary grain orientation runs parallel to the chord line of the airfoil or perpendicular to the longitudinal axis of the turbine engine component whereas the secondary grain orientation is substantially perpendicular to the rotational axis or parallel to the turbine engine component. It is also preferable that the turbine engine component is additively manufactured through a direct metal laser melting (DMLM) or direct metal laser sintering (DMLS) process.

Figure 2:
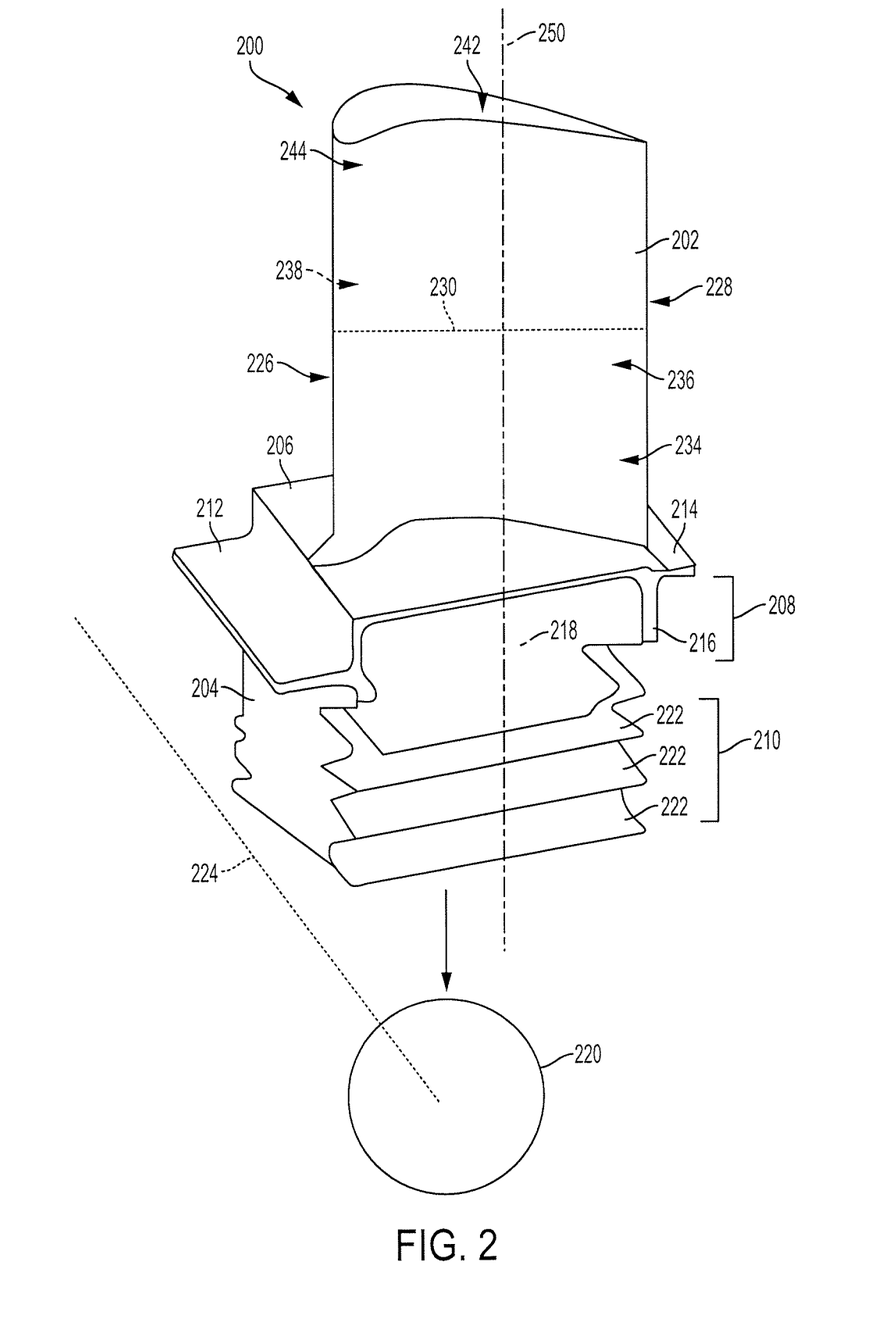
FIG. 2 provides a perspective view of a turbine blade according to an embodiment of the present invention.

FIG. 2 shows a schematic perspective of a turbine blade in accordance with an embodiment of the present invention. The blade 200 generally includes a hollow airfoil 202 and a root 204 forming the base portion of the blade. The entirety of the blade 200 is made of metal, which may be an elemental metal or an alloyed metal, such as but not limited to titanium (Ti), nickel (Ni), copper (Cu), cobalt (Co) manganese (Mn), magnesium (Mfg), iron (Fe), zinc (Zn), aluminum (Al), chromium (Cr), zinc (Zn), molybdenum (Mb), tantalum (Ta) and niobium (Nb), mixtures thereof and alloys thereof. In certain embodiments, alloyed metal used as the building material of the blade 200 contains one or more non-metallic elements such as but not limited to carbon (C), e.g. steel. In one preferred embodiment, the blade 200 is made of elemental Ti, a Ti-containing alloy or a Ti-containing superalloy. In another preferred embodiment, the blade 200 is made of elemental Ni, a Ni-containing alloy or a Ni-containing superalloy.

The root 204 has a platform 206, a shank portion 208, and a multi-lobe dovetail portion 210 having a fir tree configuration. Other suitable configurations of the dovetail are included in the present invention. The platform 206 is so-called because the surface or platform supports the airfoil 202 that is mounted upon this structural feature. On the forward side of the blade 200, there is a forward angel wing 212. On the aft side of the blade 200, there is an aft angel wing 214 and a blade skirt 216. A recess 218 may be provided within the shank portion 208 between the forward and aft sides of the blade 200. Within the recess 218, there may be provided one or more damper retention lugs, such as a forward damper retention lug and an aft damper retention lug (not shown in FIG. 2). The dovetail portion 210 is inserted into a central rotor disk 220 (not represented in proportion to the size of the blade 200 in FIG. 2) such that the dovetail lobes 222 mate with the rotor 220 to radially fix the blade 200 in place. The rotor 220 forms a part of the main shaft of a turbine engine and rotates along the axis 224.

As shown in FIG. 2, the hollow airfoil 202 has an outer wall 234 comprising a concave pressure side outer wall 236 and a convex suction side outer wall 238, joined together at a leading edge 226 and at a trailing edge 228. The dashed line 230 indicated in FIG. 2 is the chord, which as known in aeronautics is the imaginary straight line joining the leading and trailing edges 226, 228 of the airfoil 202. The airfoil 202 also includes a tip portion and a tip cap 242 which closes off the interior of the airfoil. In some embodiments, the tip cap 242 may be eliminated leaving the airfoil 202 with an open cavity. The radially outermost portion of the airfoil 202 defines a peripheral tip wall 244, sometimes referred to as a "squealer tip".

The outer wall 234 (including the concave pressure side outer wall 236 and the convex suction side outer wall 238) of the airfoil 202 and the root 204 each have homogeneous microstructures that are different from each other. In one embodiment, the metallic crystals or grains in the airfoil 202 have a primary grain orientation where the grains are aligned substantially parallel to the chord 230. Such a grain orientation significantly increases the capability of the airfoil 202 to withstand chordwise bending stresses or aeromechanical stripe modes. As used herein, the term "substantially parallel" means at least 75% parallel (e.g. 75%-100% parallel), preferably at least 80% parallel (e.g. 80%-100% parallel), more preferably at least 90% parallel (90%-100% parallel), even more preferably at least 95% parallel (95%-100% parallel), most preferably at least 99% parallel (e.g. 99%-100% parallel). In contrast, the grains in the root 204 have a secondary grain orientation where the grains are substantially perpendicular to the rotational axis 224. In that way, the root 204 is fortified against the bending load. As used herein, the term "substantially perpendicular" means at least 75% perpendicular (e.g. 75%-100% perpendicular), preferably at least 80% perpendicular (e.g. 80%-100% perpendicular), more preferably at least 90% parallel (90%-100% perpendicular), even more preferably at least 95% perpendicular (95%-100% perpendicular), most preferably at least 99% perpendicular (e.g. 99%400% perpendicular).

In some embodiments, such as the one presented in FIG. 2, the turbine blade 200 further includes a distinct graded transition portion that is disposed between the airfoil 202 having grains aligned substantially parallel to the chord 230 and the root 204 having grains aligned substantially perpendicular to the rotational axis 224. Like the airfoil 202 and the root 204, the graded transition portion also has a homogeneous structure but this homogeneous microstructure is different from the homogeneous microstructures of the airfoil 202 and the root 204. The graded transition portion is so-called the metallic grains contained therein have an orientation or a combination of orientations that is between the primary grain orientation in the airfoil 202 and the secondary grain orientation in the root 204. In the embodiment of FIG. 2, the platform 206 forms the graded transition portion. In an alternative embodiment, a small portion that is proximal to the base edge of the airfoil 202 forms the graded transition portion. In yet another embodiment, the graded transition portion includes both the small portion proximal to the base edge of the airfoil 202 and the platform 206. The graded transition portion has a defined thickness of 100 μm to 10,000 μm, preferably 500 μm to 7,500 μm, more preferably 1,000 μm to 5,000 μm.

Figure 3:
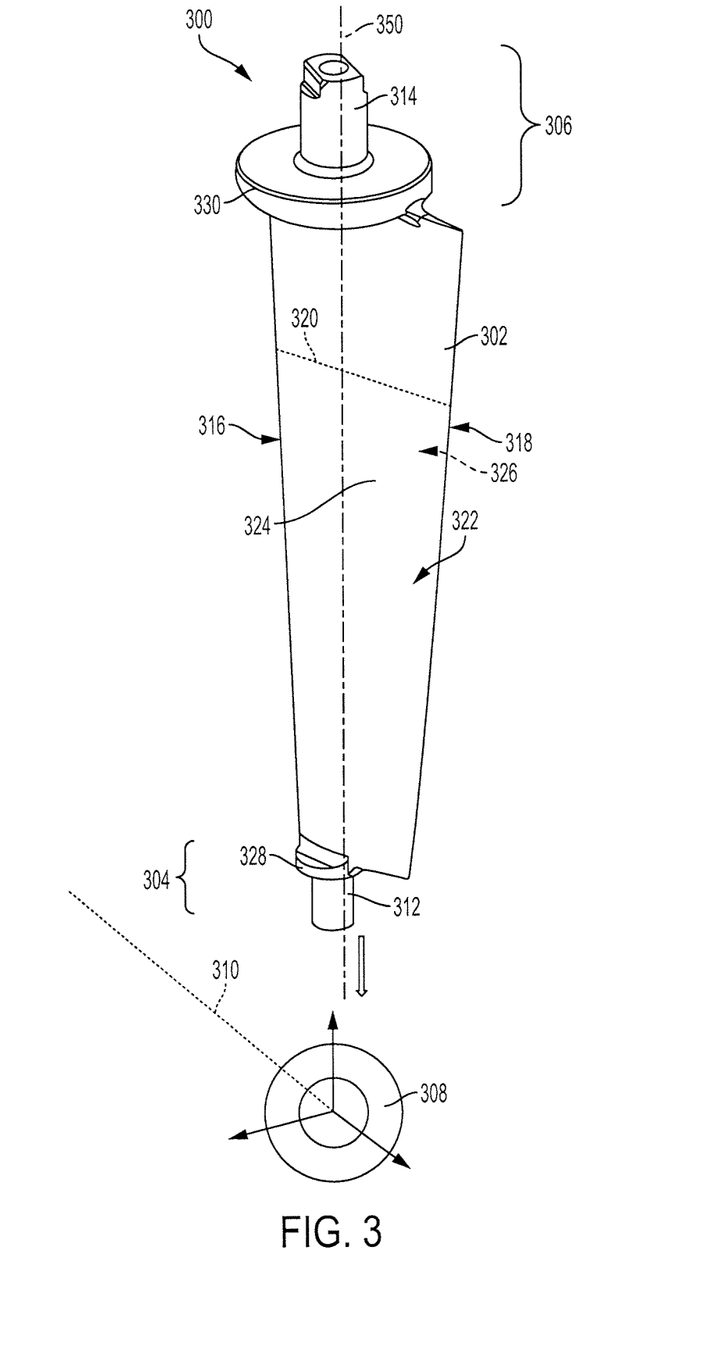
FIG. 3 provides a perspective view of a stator vane according to an embodiment of the present invention.

In FIG. 3, a schematic perspective of a stator vane in accordance with an embodiment of the present invention is shown. The vane 300 generally includes an airfoil 302, an inner trunnion 304 and an outer trunnion 306. Like the turbine blade 200, the entirety of the vane 300 is made of metal, which may be an elemental metal or an alloyed metal, such as but not limited to titanium (Ti), nickel (Ni), copper (Cu), cobalt (Co) manganese (Mn), magnesium (Mg), iron (Fe), zinc (Zn), aluminum (Al), chromium (Cr), zinc (Zn), molybdenum (Mb), tantalum (Ta) and niobium (Nb), mixtures thereof and alloys thereof. In certain embodiments, alloyed metal used as the building material of the vane 300 contains one or more non-metallic elements such as but not limited to carbon (C). In one preferred embodiment, the blade 200 is made of elemental Ti, a Ti-containing alloy or a Ti-containing superalloy. In another preferred embodiment, the vane 300 is made of elemental Ni, a Ni-containing alloy or a Ni-containing superalloy.

In an assembled turbine engine, the inner trunnion 304, or more specifically the inner trunnion pin 312 fits into a bore of an inner shroud ring 308 (not represented in proportion to the size of the vane 300). The inner shroud ring 308 has a rotational axis 310. The outer trunnion portion 306, on the other hand, fits into a bore of the compressor case (not shown) where the outer trunnion pin 314 protrudes through the case.

Like the airfoil 202, the airfoil 302 is also hollow and has an outer wall 322 comprising a concave pressure side outer wall 324 and a convex suction side outer wall 326, joined together at a leading edge 316 and at a trailing edge 318. The dashed line 320 indicated is the chord, the imaginary straight line joining the leading and trailing edges 316, 318 of the airfoil 302.

The outer wall 322 (including the concave pressure side outer wall 324 and the convex suction side outer wall 326) of the airfoil 302 has a homogeneous microstructure that is different from the homogeneous microstructure of the inner and outer trunnion pins 312, 314. In one embodiment, the metallic crystals or grains in the airfoil 302, having a primary grain orientation, are oriented in such a manner that these grains are aligned substantially parallel to the chord 320, which significantly increases the capability of the airfoil 302 to withstand chordwise bending stresses or aeromechanical stripe modes. The term "substantially parallel" means the same as defined above. Conversely, the grains in the inner and outer trunnion pins 312, 314 have a secondary grain orientation where the grains are aligned substantially perpendicular to the rotational axis 310. Such an orientation renders the inner and outer trunnion pins 312, 314 increased strength to withstand the bending load. The term "substantially perpendicular" means the same as defined above.

Still referring to FIG. 3, the inner and outer trunnions 304, 306 each include base portions (i.e. inner base 328 and outer base 330) that are sandwiched between the trunnion pins 312, 314 and the airfoil 302. In certain embodiments, these base portions 328, 330 or a portion thereof serve as the graded transition portions of the vane 300 where the metallic grains contained therein have an orientation that is between the primary grain orientation in the airfoil 302 and the secondary grain orientation in the trunnion pins 312, 314. Each of these graded transition portions has a defined thickness of 100 µm to 10,000 µm, preferably 500 µm to 7,500 µm, more preferably 1,000 µm to 5,000 µm.

Additionally or alternatively, the primary grain orientation of the airfoils 202, 302 and the secondary grain orientation of the root 204 and trunnion pins 312, 314 may be described or defined in reference the longitudinal axis, respectively. In one embodiment, the metallic grains contained in the airfoils 202, 302 are uniformly 60°-90° in relation to or 66.7%-100% perpendicular to respectively the longitudinal axis 250 or 350, preferably 75°-90° or 83.3%-100%, more preferably 80°-90° or 88.9%-100%. The metallic grains contained in the root 204 and trunnion pins 312, 314 are uniformly 0°-30° in relation to or 0-33.3% perpendicular to respectively the longitudinal axis 250 or 350, preferably 0°-15° or 0%-16.7%, more preferably 0°-10° or 0%-11.1%. In one embodiment, the metallic grains contained in the graded transition portions, such as the platform 206 and the trunnion bases 328, 330, are uniformly 15°-75° in relation to or 16.7%-83.3% perpendicular to respectively the longitudinal axis 250 or 350, preferably 30°-60° or 33.3%-66.7%, more preferably 45°-60° or 50%-66.7%. In another embodiment, the metallic grains contained in these graded transition portions have a mixture of different orientations that are 15°-75° in relation to or 16.7%-83.3% perpendicular to respectively the longitudinal axis 250 or 350, preferably 30°-60° or 33.3%-66.7%, more preferably 45°-60° or 50%-66.7%.

Figure 4A:
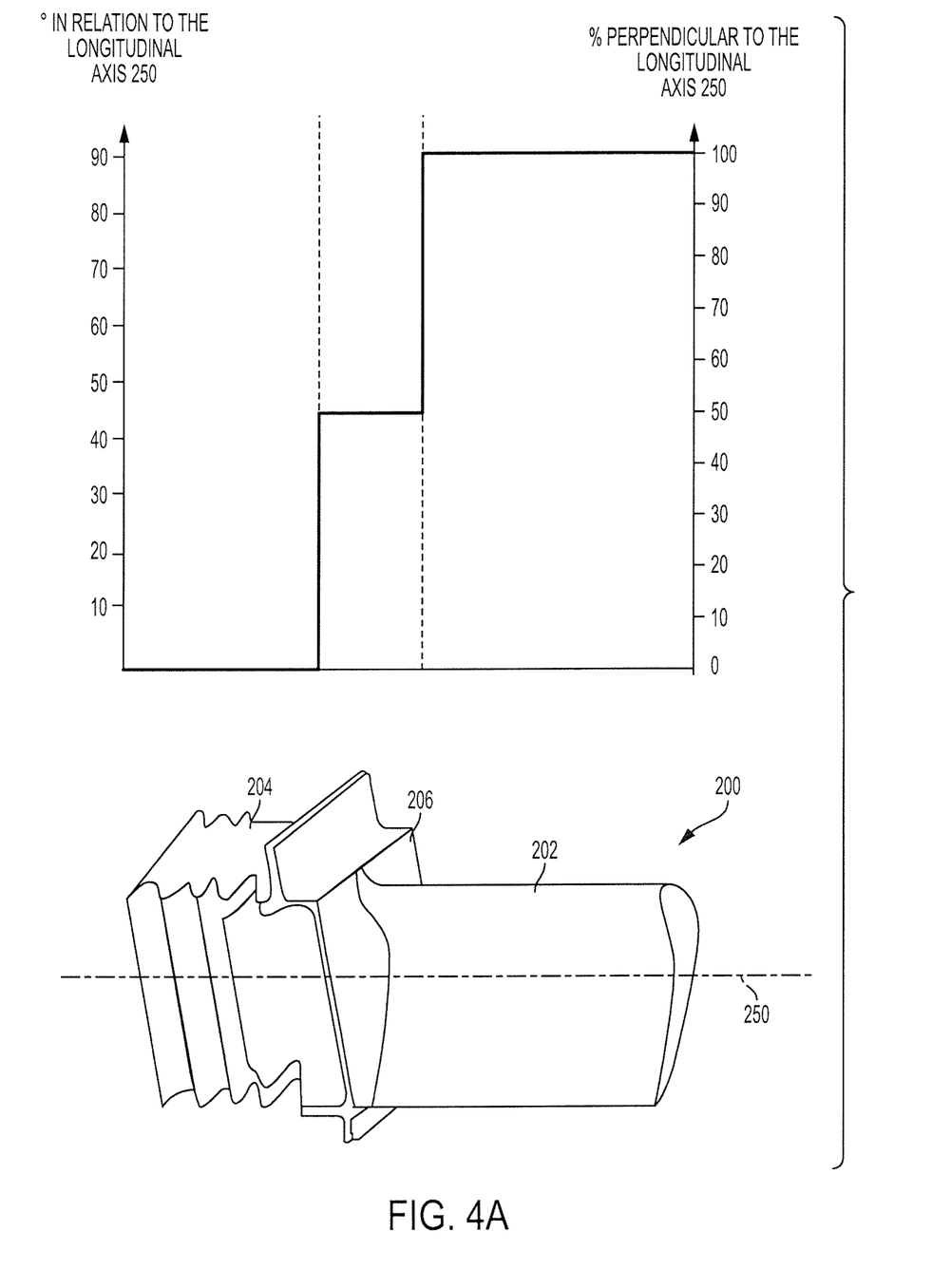
FIG. 4A shows a graph of multiple controlled metallic grain orientations of a turbine blade according to an embodiment of the present invention.
Figure 4B:
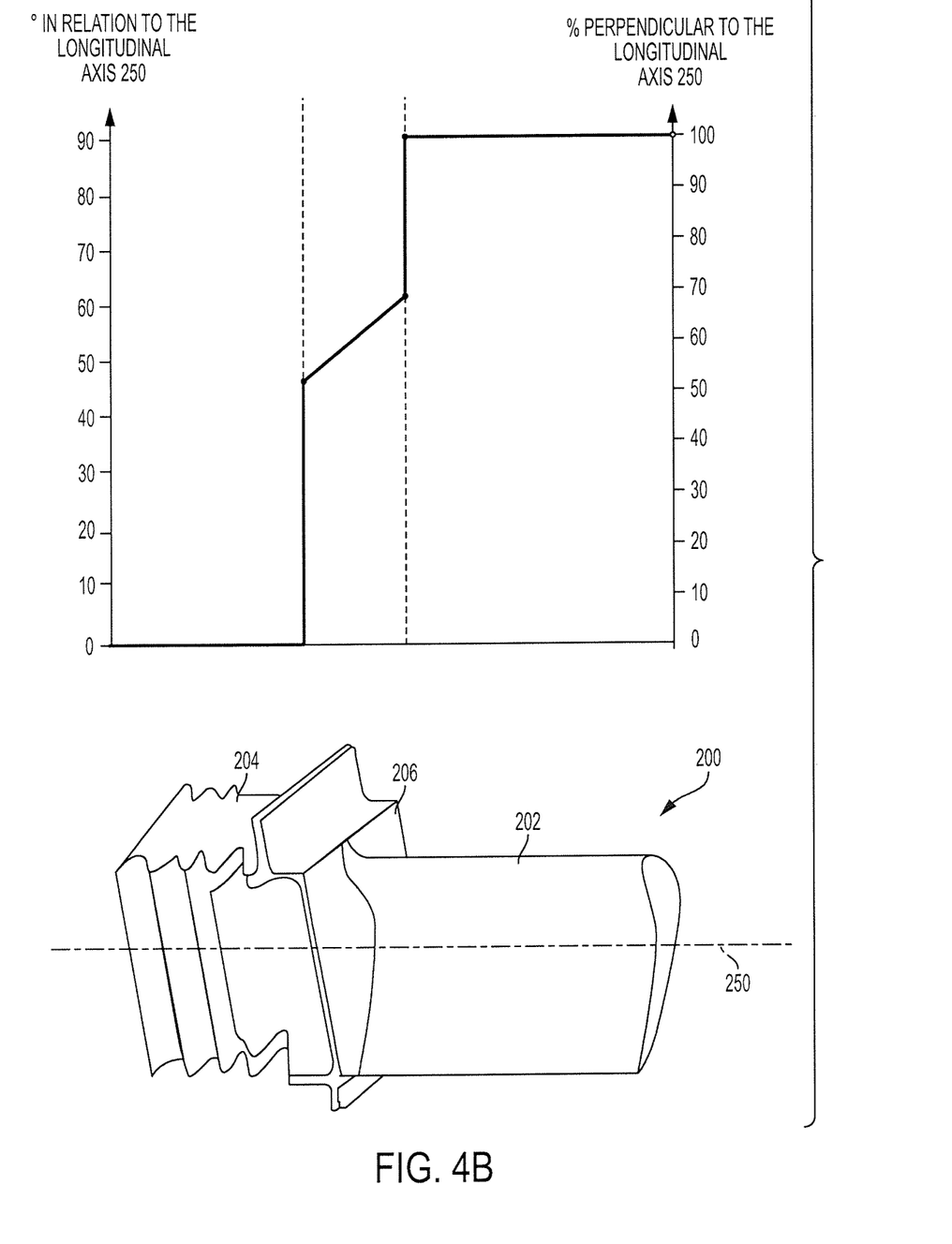
FIG. 4B shows a graph of multiple controlled metallic grain orientations of a turbine blade according to another embodiment of the present invention.

The graphs in FIGS. 4A and 4B show the turbine blade 200 having a root 204 grain orientation of 0° in relation to or 0% perpendicular to the longitudinal axis 250 (i.e. 100% parallel to the longitudinal axis 250), a platform 206 having a grain orientation of 45° (FIG. 4A) or a mixture of grain orientations in the range of 45°-60° (FIG. 4B) in relation to the longitudinal axis 250 (which translates to respectively 50% or 50%-66.7% perpendicular to the longitudinal axis 250), and an airfoil 202 grain orientation of 90° in relation to or 100% perpendicular to the longitudinal axis 250.

Figure 5A:
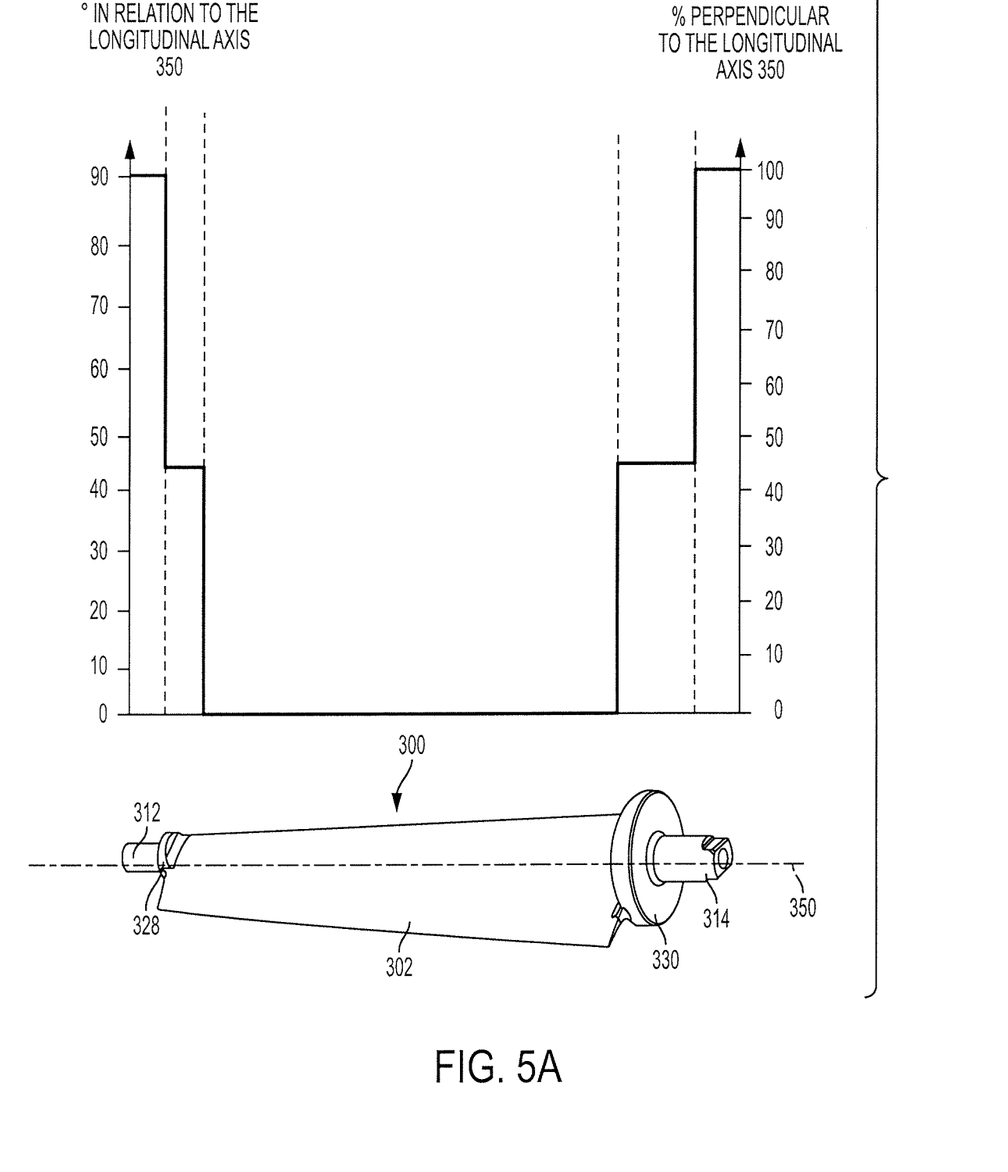
FIG. 5A shows a graph of multiple controlled metallic grain orientations of a stator vane according to an embodiment of the present invention.
Figure 5B:
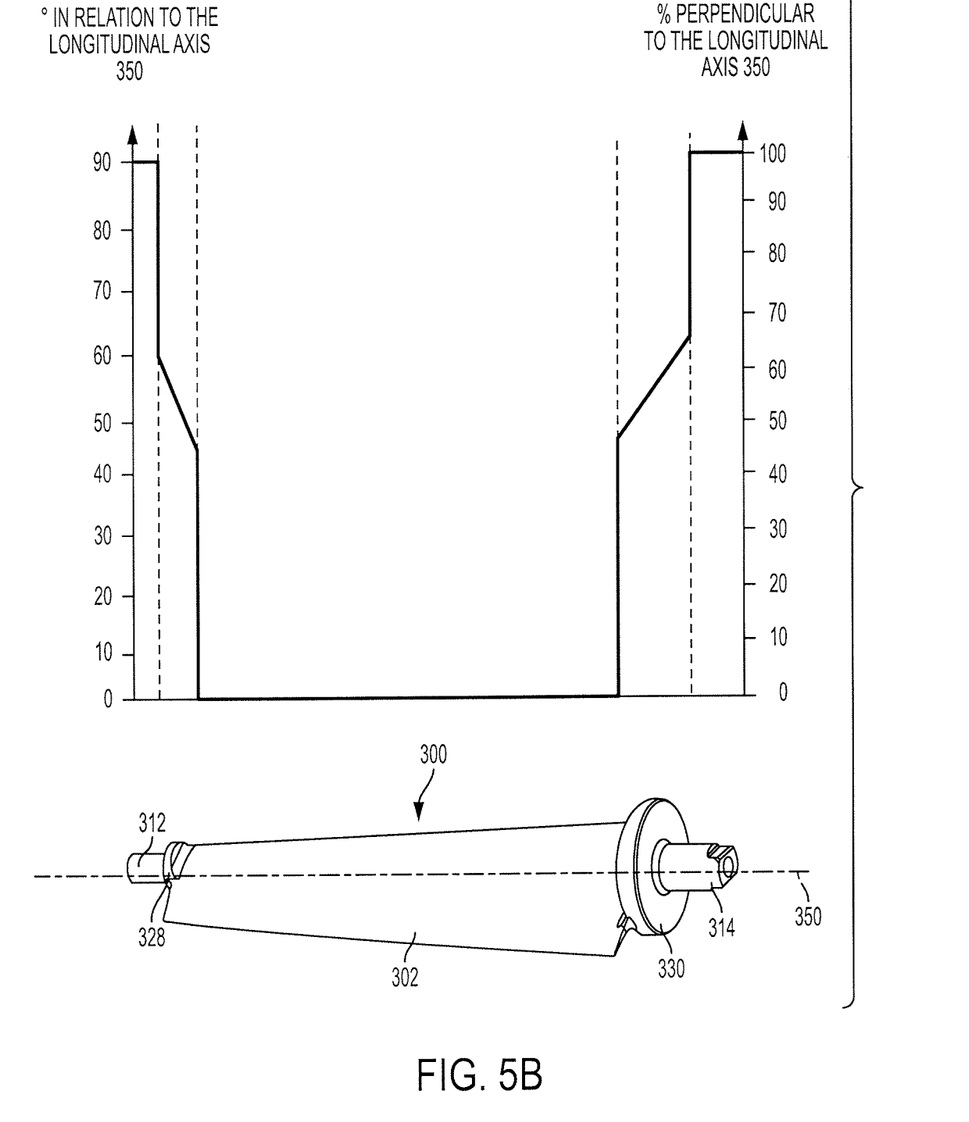
FIG. 5B shows a graph of multiple controlled metallic grain orientations of a stator vane according to another embodiment of the present invention.

The graphs in FIGS. 5A and 5B show the stator vane 300 having a trunnion pin 312/314 grain orientation of 0° in relation to or 0% perpendicular to the longitudinal axis 350 (i.e. 100% parallel to the longitudinal axis 350), a trunnion base 328/330 having a grain orientation of 60° (FIG. 5A) or a mixture of grain orientations in the range of 45°-60° (FIG. 5B) in relation to the longitudinal axis 350 (which translates to respectively 50% or 50%-66.7% perpendicular to the longitudinal axis 350), and an airfoil 302 grain orientation of 90° in relation to or 100% perpendicular to the longitudinal axis 350.

The present disclosure further provides methods of additively manufacturing a turbine engine component having multiple controlled metallic grain orientations. The turbine engine component is preferably a radial component, which includes but is not limited to a turbine blade or a stator vane. Preferably, the turbine engine component is manufactured using a direct metal laser melting (DMLM) or direct metal laser sintering (DMLS) process, depending on whether the metallic material of choice is an elemental metal or an alloyed metal.

Figure 6:
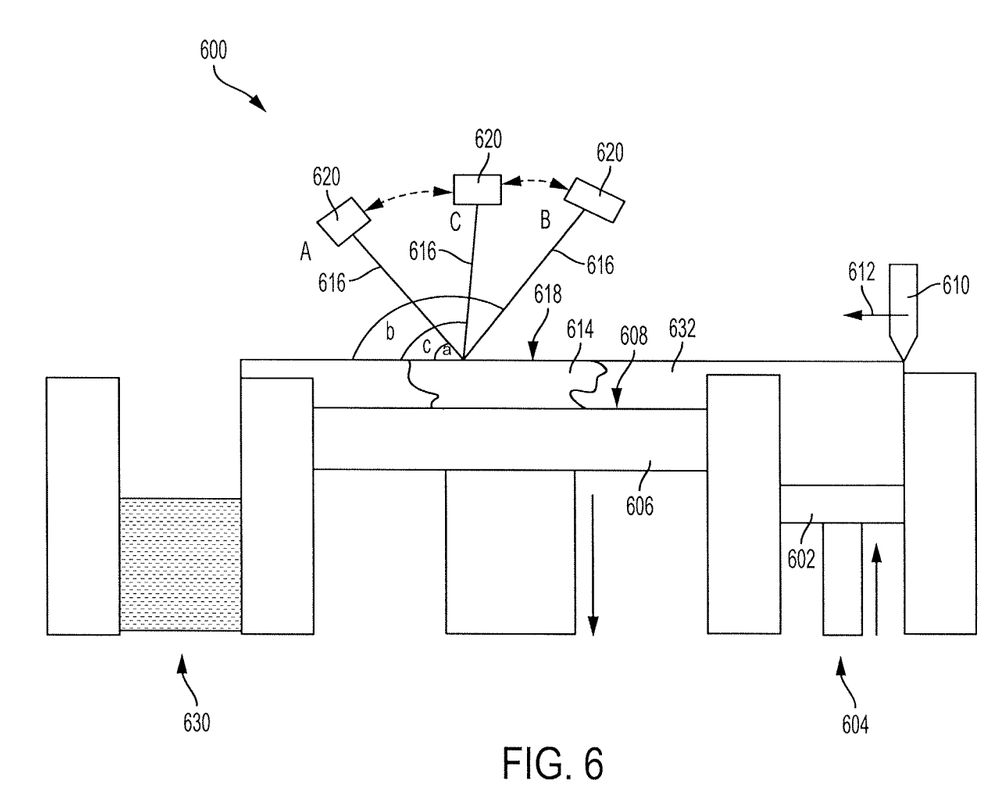
FIG. 6 is a schematic diagram of an exemplary direct metal laser melting (DMLM) or direct metal laser sintering (DMLS) system adapted to implement a method of manufacturing a turbine engine component having multiple controlled grain orientations of the present invention.

Referring to FIG. 6, which shows an example of a laser powder bed fusion system, i.e. the system 600, that is adapted to implement a method of additively manufacturing a turbine engine component having multiple controlled metallic grain orientations. The system 600 includes a build plate 606 that is flanked by a feed powder reservoir 604 at one end and if desired, an excess powder receptacle 630 at the other end. In a particular embodiment, the build plate 606 is eliminated altogether from the system 600. During production, an elevator 602 in the feed powder reservoir 604 lifts a prescribed dose of metallic powder above the level of the optional build plate 606. The prescribed dose of metallic powder is then spread in a thin, even layer 632 over the build surface 608 by a recoater mechanism 610. The recoater mechanism 610 may be a hard scraper, a soft squeegee, or a roller. For example, as shown in FIG. 4, the powder is spread in a direction as indicated by the arrow 612. Overflows from the build plate 606 are collected by the excess powder receptacle 630, the optionally treated to sieve out rough particles before re-use.

A selective portion of the metallic powder 614 that corresponds to a "slice" or a layer of the turbine engine component to be manufactured is then sintered (as it is in DMLS) or melted (as it is in DMLM) by a focused laser 616 scanning across the surface of the selective portion 618. In other words, the powder layer 632 is subjected to laser radiation in a site-selective manner in dependence on computer-aided design (CAD) data, which is based on the desired geometry of the turbine engine component that is to be produced. The laser irradiation sinters or melts the raw metallic powder, and the sintered/melted area then re-solidifies and re-crystallizes into a fused region of the turbine engine component.

Using a plurality of movable mirrors or scanning lenses (not shown), a galvanometer scanner 620 moves or scans the focal point of a unfocused laser beam emitted by a laser source (now shown) across the build surface 618 during the DMLS/DMLM process. In a preferred embodiment, telecentric lenses are utilized for the laser scanning. Unlike the prior art galvanometer scanners which are typically fixated or stationary, the galvanometer scanner 420 in accordance with the present invention is mobile and whose movements and movement directions are electrically controlled, for example, by a computing device having at least one processing circuitry and with suitable command language.

Accordingly, in order to manufacture a turbine engine component having multiple controlled grain orientations, the galvanometer scanner 620 moves to different positions, thereby enabling the multiple laser irradiation steps in the DMLS/DMLM manufacturing process to be performed at different angles. Each different position of the galvanometer scanner 620 and each resultant different laser irradiation angle correspond to a specific grain orientation in the turbine engine component produced. For example, referring to FIG. 6, when printing the airfoil 202 of the turbine blade 200 or the airfoil 302 of the stator vane 300, the galvanometer scanner 620 moves to a first position (e.g. position A), which translates into a first laser irradiation angle (e.g. angle α). Both the first scanner position and the first laser irradiation angle correspond to a primary grain orientation that is substantially parallel to the chord 230 or 320, respectively.

In a similar manner, when printing the root 204 of the turbine blade 200 or the trunnion pins 312, 314 of the stator vane 300, the galvanometer scanner 420 moves to a second position (e.g. position C), which translates into a second laser irradiation angle (e.g. angle c). Both the second scanner position and the second laser irradiation angle correspond to a secondary grain orientation that is substantially perpendicular to the rotational axis 224 or 310, respectively.

And likewise, when printing the graded transition portion 206 of the turbine blade 200 or the graded transition portions 316, 318 of the stator vane 300, the galvanometer scanner 420 moves to a third position (e.g. position B), which translates into a third laser irradiation angle (e.g. angle b). Both the third scanner position and the third laser irradiation angle correspond to a tertiary grain orientation that is between the primary and secondary grain orientations.

It should be noted that as used herein, the terms "first", "second", "third", "primary", "secondary", "tertiary" and the like are not intended to denote sequence, order, rank or level of importance and that such terms are used solely for clarity purpose, that is to distinguish one element or feature of the same class or category from one another.

Other alternative methods may be employed in the additive manufacturing of the turbine engine component having multiple controlled grain orientations of the present invention, such as the methods described in U.S. Patent Application Publication Nos. 2014/0154088 (assigned to ALSTOM Technology Ltd.) and 2016/0008922 (assigned SLM Solutions Group AG), the disclosures thereof are incorporated herein by reference in their entireties. The manufacturing processes disclosed in both of these applications abide with the general principle of DMLM or DMLS, and may be subjected to modifications. For example, in US 2014/0154088, the primary and secondary grain orientations of the turbine blade 200 or stator vane 300 may be realized by applying specific scanning patterns of the energy beam such that they are aligned to be parallel to the chord 230 or 320, and to be perpendicular to the rotational axis 224 or 310, respectively. In US 2016/0008922, the primary and secondary grain orientations of the turbine blade 200 or stator vane 300 may be achieved by controlling the operation of the powder application device and the irradiation device in dependence of the crystallization behavior of the raw metallic powder.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A turbine engine component, comprising:
a longitudinal axis;
a first region with a first metallic grain orientation that is substantially perpendicular to the longitudinal axis;
one or more second regions with a second metallic grain orientation that is different from the first metallic grain orientation; and
one or more graded transition regions disposed between the first and one or more second regions, wherein the component is a stator vane and the stator vane comprises an airfoil as the first region, and an inner trunnion pin and an outer trunnion pin as the second regions.

2. The turbine engine component of claim 1, wherein the one or more graded transition regions has one or more third metallic grain orientations that are different from the first and second metallic grain orientations.

3. The turbine engine component of claim 2, wherein the one or more graded transition regions each has a thickness in the range of 100 μm to 10,000 μm.

4. A turbine engine component, comprising:
a longitudinal axis;
a first region with a first metallic grain orientation that is substantially perpendicular to the longitudinal axis;
one or more second regions with a second metallic grain orientation that is substantially parallel to the longitudinal axis; and
one or more graded transition regions disposed between the first and one or more second regions, wherein the component is a stator vane and the stator vane comprises an airfoil as the first region, and an inner trunnion pin and an outer trunnion pin as the second regions.

5. The turbine engine component of claim 4, wherein the one or more graded transition regions has one or more third metallic grain orientations that are different from the first and second metallic grain orientations.

6. The turbine engine component of claim 5, wherein the one or more graded transition regions each has a thickness in the range of 100 μm to 10,000 μm.

7. A turbine engine component, comprising:
a longitudinal axis;
a first region with a first metallic grain orientation that is substantially perpendicular to the longitudinal axis;
one or more second regions with a second metallic grain orientation that is different from the first metallic grain orientation; and
one or more graded transition regions disposed between the first and one or more second regions, wherein the one or more graded transition regions has one or more third metallic grain orientations that are different from the first and second metallic grain orientations, and wherein the one or more graded transition regions each has a thickness in the range of 100 µm to 10,000 µm.

8. The turbine engine component of claim 7, wherein the component is a blade or a stator vane.

9. The turbine engine component of claim 8, wherein the component is a blade and the blade comprises an airfoil as the first region and a root as the second region.

10. A turbine engine component, comprising:
a longitudinal axis;
a first region with a first metallic grain orientation that is substantially perpendicular to the longitudinal axis;
one or more second regions with a second metallic grain orientation that is substantially parallel to the longitudinal axis; and
one or more graded transition regions disposed between the first and one or more second regions, wherein the one or more graded transition regions has one or more third metallic grain orientations that are different from the first and second metallic grain orientations, and wherein the one or more graded transition regions each has a thickness in the range of 100 µm to 10,000 µm.

11. The turbine engine component of claim 10, wherein the component is a blade or a stator vane.

12. The turbine engine component of claim 11, wherein the component is a blade and the blade comprises an airfoil as the first region and a root as the second region.

* * * * *